(12) United States Patent
Butchart

(10) Patent No.: US 6,564,195 B1
(45) Date of Patent: May 13, 2003

(54) DATA CLASSIFIER OUTPUT INTERPRETATION

(75) Inventor: Kate Butchart, Stevenage (GB)

(73) Assignee: Cerebrus Solutions Limited (GB)

(*) Notice: Subject to any disclaimer, the term of this patent is extended or adjusted under 35 U.S.C. 154(b) by 0 days.

(21) Appl. No.: 09/358,975

(22) Filed: Jul. 22, 1999

(51) Int. Cl.[7] .............................................. G06F 15/18
(52) U.S. Cl. ............................ 706/20; 700/48; 700/47
(58) Field of Search ............................ 706/20, 12, 21, 706/18; 704/271; 382/157; 324/772; 700/48, 47

(56) References Cited

U.S. PATENT DOCUMENTS

| | | | |
|---|---|---|---|
| 5,239,594 A | * 8/1993 | Yoda | 382/158 |
| 5,442,729 A | * 8/1995 | Kramer et al. | 704/271 |
| 5,444,819 A | * 8/1995 | Negishi | 706/21 |
| 5,487,133 A | * 1/1996 | Park et al. | 706/20 |
| 5,493,688 A | * 2/1996 | Weingard | 382/187 |
| 5,574,387 A | * 11/1996 | Petsche et al. | 706/18 |
| 5,576,632 A | * 11/1996 | Petsche et al. | 324/772 |
| 5,581,459 A | * 12/1996 | Enbutsu et al. | 700/32 |
| 5,590,218 A | * 12/1996 | Ornstein | 382/157 |
| 5,640,103 A | * 6/1997 | Petsche et al. | 324/772 |
| 5,675,711 A | * 10/1997 | Kephart et al. | 706/12 |
| 5,720,003 A | * 2/1998 | Chiang et al. | 706/21 |
| 5,745,654 A | 4/1998 | Titan | 706/20 |

FOREIGN PATENT DOCUMENTS

| | | | | |
|---|---|---|---|---|
| DE | 0 468 229 A2 | * | 1/1992 | G06F/15/80 |
| EP | 0 468 229 A2 | | 1/1992 | |
| EP | 0 546 835 A2 | | 6/1993 | |
| GB | 0 564 835 A2 | * | 6/1993 | G06F/15/80 |
| WO | WO 94/12948 | | 6/1994 | |

OTHER PUBLICATIONS

International Search Report Completed on Oct. 23, 2001 and mailed on Oct. 31, 2001.

Robert Andrews, et al., "Survey and Critique of Techniques for Extracting Rules from Trained Artificial Neural Networks," in Knowledge–Based Systems, vol. 8, No. 6, pp. 373–389, Dec. 6, 1995.

F. Maire, "Rule–extraction by Backpropagation of Polyhedra," in Neural Networks 12, pp. 717–725, 1999.

* cited by examiner

Primary Examiner—John Follansbee
Assistant Examiner—Michael B. Holmes
(74) Attorney, Agent, or Firm—Kevin A. Oliver; Foley Hoag LLP

(57) ABSTRACT

A method, apparatus, and computer software are provided whereby to associate a readily user-interpretable reason with an output of a supervised training data classifier. Reasons are associated with one or more members of a sequence of training vectors and subsequently associated, in operation, with a given classifier input by comparing the classifier input vector with training sequence vectors. A measure of confidence in the selected reasons is derived by comparing the classifier input vector with the corresponding training inputs with which the selected reasons were associated and calculating a measure of their closeness.

21 Claims, 2 Drawing Sheets

DATA CLASSIFIER OUTPUT INTERPRETATION

FIELD OF THE INVENTION

The present invention relates to a method and apparatus for interpretation of data classifier outputs and a system incorporating the same.

BACKGROUND TO THE INVENTION

Trainable data classifiers (for example Neural Networks) can learn to classify given input vectors into the required output group with a high degree of accuracy. However, a known limitation of such data classifiers is that they do not provide any explanation or reason as to why a particular decision has been made. This "black box" nature of the decision making process is a disadvantage when human users want to be able to understand the decision before acting on it.

Such data classifiers can be split into two main groups: those which have a supervised training period and those which are trained in an unsupervised manner. Those trained in a supervised manner (i.e. supervisedly trained data classifiers) include, for example, Multi Layer Perceptrons (MLPs).

In order for a supervisedly trained data classifier (e.g. Neural Network) to be trained, a training set of examples has to be provided. The examples contain associated input/output vector pairs where the input vector is what the data classifier will see when performing its classification task, and the output vector is the desired response for that input vector. The data classifier is then trained over this set of input/output pairs and learns to associate the required output with the given inputs. The data classifier thereby learns how to classify the different regions of the input space in line with the problem represented in the training set. When the data classifier is subsequently given an input vector to classify it produces an output vector dependant upon the previously learned region of the input space that the input vector occupies.

In the case of some very simple classification problems, the "reasoning" made by the data classifier may, perhaps, be intuitively guessed by a user. However, Neural Networks are typically used to solve problems without a well bounded problem space and which have no solution obvious to humans. If the rules defining such a problem were clear then a rule-based system would probably provide a more suitable classifier than a supervisedly trained data classifier such as a Neural Network. A typical data classifier application involves complex, high-dimensional data where the rules between input vectors and correct classification are not at all obvious. In such situations the supervisedly trained data classifier becomes a complex, accurate decision maker but unfortunately offers the human end user no help understanding the decision that it has reached. In many situations the end user nevertheless wishes to understand, at least to some degree, why a given supervisedly trained data classifier has reached a decision before the user can act upon that decision with confidence.

In the past, much work has been directed to extracting rules from Neural Networks, where people have attempted to convert the weights contained within the Neural Network topology into if-then-else type rules [Andrews, R., Diederich, J., & Tickle, A. (1995): "A survey and critique of techniques for extracting rules from trained artificial neural networks" in *Knowledge Based Systems*, 8(6), pp.373–389]. This work has had only limited success and the rules generated have not been clear, concise, nor readily understandable. Work has also been performed which concentrates on the problem as a rule inversion problem; given a subset Y of the output space, find the reciprocal image of Y by the function f computed by the Neural Network [Maire, F. (1995): "Rule-extraction by back-propagation of polyhedra" in *Neural Networks*, 12(4–5), pp. 717–725. Pub. Elsevier/pergamon, ISSN 0893–6080]. This method back-propagates regions from the output layer back to the input layer. Unfortunately, whilst this method is theoretically sound, the output from this method is once again not readily understandable to the user, and so does not solve the problem of helping the user to understand the reason for a Neural Network's decision.

Other methods which have been tried in the past divide each individual value in the input vector into different categories (percentile bins). This technique is described in, for example, U.S. Pat. No. 5,745,654. Each percentile bin has associated with it an explanation describing the meaning of the associated individual input value rather than for the whole vector of input values. A reason is then associated with the output vector, selected as being the reason associated with the most significant input variable in the input vector. This method does not take into consideration the facts that the data classifier classifies on the input vector as a whole and that relationships between input variables are often significant. It also requires some definition of relative significance of the component variables of an input vector which is not always meaningful.

OBJECT OF THE INVENTION

The invention seeks to provide an improved method and apparatus for interpreting outputs from supervisedly trained data classifiers.

SUMMARY OF THE INVENTION

The present invention provides to a user a textual (or other representation of a) reason for a decision made by a supervisedly trained data classifier (e.g. Neural Network). The reason may be presented only when it is required, in a manner that does not hinder the performance of the data classifier, is easily understood by the end user of the data classifier, and is scaleable to large, high dimensional data sets.

According to a first aspect of the present invention there is provided a method of operating a supervisedly trained data classifier, comprising the steps of: generating an output vector responsive to provision of an input vector; associating a reason with said classifier output vector responsive to a comparison between said classifier input vector and a previously stored association between a training vector used to train said classifier and said reason.

Advantageously, the method of operation facilitates later interpretation of the classifier outputs by a user, and is scaleable to large, high dimensional data sets.

Preferably, the method additionally comprises the step of: presenting to a user information indicative of said output vector, of said reason, and of their association.

Advantageously, the association enables the user to interpret the classifier outputs more rapidly and more directly.

Preferably, the method additionally comprises the step of: associating with said reason a measure of a degree of confidence with which said reason is associated with said input vector.

Preferably, the method additionally comprises the step of: presenting to said user information indicative of said measure of a degree of confidence.

Preferably, the method wherein said degree of confidence is calculated responsive to a comparison between said training vector and said input vector.

Preferably, said degree of confidence is calculated as a distance between said input vector and an input vector component of said training vector.

Preferably, said distance is a Euclidean distance.

Advantageously, these measures are simple to calculate and provide a good and intuitively easy to understand measure of confidence.

In a preferred embodiment, a plurality of reasons may be associated with said classifier output vector responsive to comparisons between said classifier input vector and a plurality of previously stored associations between training vectors used to train said classifier and said reasons.

Preferably, the method additionally comprises the step of: associating with each said reason a measure of a degree of confidence with which said reason is associated with said input vector.

Preferably, the method additionally comprises the step of: presenting to said user information indicative of said measure of a degree of confidence.

Advantageously, this allows the user to identify and to concentrate interpretation effort on reasons allocated a high degree of confidence.

Preferably, said information is presented sorted according to said measures of confidence.

Advantageously, this allows the user to identify reason allocated the highest degree of confidence more readily, thereby speeding the user's interpretation of the presented information.

Preferably, each said reason is presented selectively responsive to a comparison between said measure of degree of confidence associated with said reason and a threshold criteria.

Advantageously, this allows the amount of information presented to a user to be limited, so that the user is not swamped with large numbers of potential reasons, some of which may have only been allocate a small degree of confidence.

The invention also provides a method of operating a supervisedly trainable data classifier, comprising the steps of: associating a reason with at least one training vector; training said data classifier using said training vector; providing an input vector to said data classifier whereby to generate an output vector; associating said reason with said output vector responsive to a comparison between said input vector and said at least one training vector.

In a preferred embodiment, said data classifier comprises a neural network.

According to a further aspect of the present invention there is provided a data classifier system, comprising: a supervisedly trained data classifier arranged to provide an output vector responsive to receipt of an input vector; a store containing an association between a reason and a training vector previously used to train said classifier; a data processing subsystem arranged to associate said reason with an output vector received from said data classifier, responsive to a comparison between said input vector and said training vector.

Preferably, the data classifier system additionally comprises: a computer display arranged to present an indication of said reason and an indication of said output vector to a user.

Preferably, the data classifier system additionally comprises: a data processing subsystem arranged to calculate a measure of a degree of confidence with which said reason is associated with said input vector.

Preferably, said display is arranged to present an indication of said degree of confidence to said user.

According to a further aspect of the present invention there is provided an anomaly detection system comprising a data classifier system according the to present invention.

According to a further aspect of the present invention there is provided an account fraud detection system comprising a data classifier according the to present invention.

According to a further aspect of the present invention there is provided a telecommunications account fraud detection system comprising a data classifier according the to present invention.

The invention also provides for a system for the purposes of digital signal processing which comprises one or more instances of apparatus embodying the present invention, together with other additional apparatus.

According to a further aspect of the present invention there is provided computer software in a machine-readable medium arranged to perform the steps of: receiving an input vector; providing an output vector indicative of a classification of said input vector; associating a reason with said classifier output vector responsive to a comparison between said classifier input vector and a previously stored association between a training vector used to train said classifier and said reason.

Preferably, the computer software is additionally arranged to perform the steps of: associating with said output vector a measure of a degree of confidence with which said reason is associated with said input vector.

Preferably, the computer software is additionally arranged to perform the steps of: associating a reason with at least one training vector for a data classifier; training said data classifier using said training vector; providing an input vector to said data classifier whereby to generate an output vector; associating said reason with said output vector responsive to a comparison between said input vector and said at least one training vector.

The preferred features may be combined as appropriate, as would be apparent to a skilled person, and may be combined with any of the aspects of the invention.

BRIEF DESCRIPTION OF THE DRAWINGS

In order to show how the invention may be carried into effect, embodiments of the invention are now described below by way of example only and with reference to the accompanying figures in which.

DETAILED DESCRIPTION OF INVENTION

A simple example of training data for a supervised training data classifier is the XOR (logical "exclusive or") problem shown in Table 1. Whilst in practice problems addressed by data classifiers are typically much more complex, the XOR problem is adequate for a clear exposition of the invention.

The XOR classifier has two inputs, Input1 and Input2, and two outputs Output1 and Output2. Data values input on Input1 and Input2 should lie in the approximate range 0 to 1 (and ideally ought to be precisely 0 or 1).

Output1 should be at value 1 (active) if both inputs are the same value;

Output2 should be active if one, but not both, of the inputs are active.

TABLE 1

XOR training vectors

|  | Input 1 | Input2 | Output1 | Output 2 |
|---|---|---|---|---|
| Vector1 | 0 | 0 | 1 | 0 |
| Vector2 | 0 | 1 | 0 | 1 |
| Vector3 | 1 | 0 | 0 | 1 |
| Vector4 | 1 | 1 | 1 | 0 |

We define Class1 to be the classification if Output1 is 1 and Output2 is 0; Class2 to be the classification if Output1 is 0 and Output2 is 1.

Figure 1:
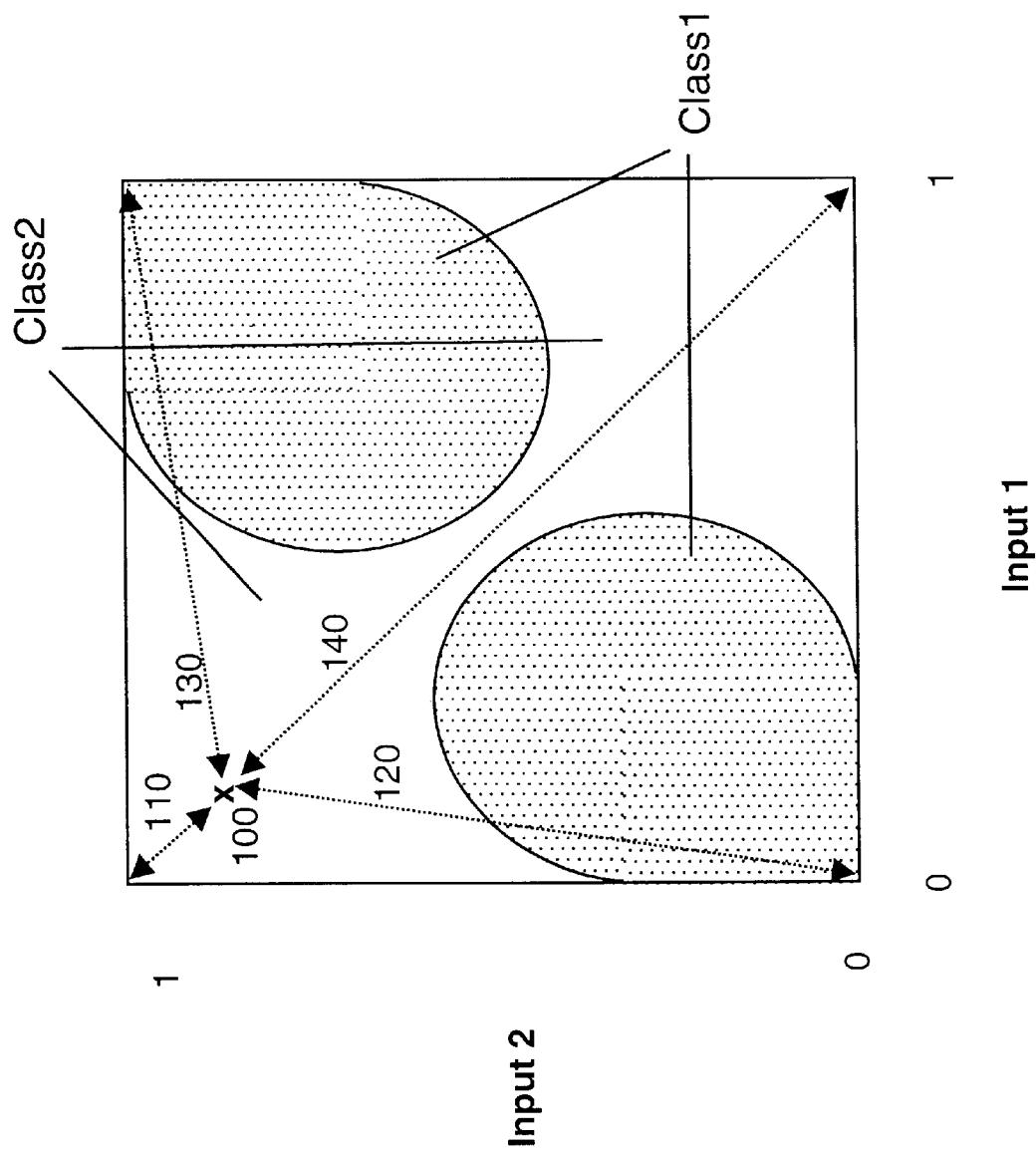
FIG. 1 shows a simple example of a classifier input space and corresponding output classification regions.

Referring now to FIG. 1, there is shown a representation of the four training input vector values of Table 1 in their two dimensional space. It also shows a potential solution to defining the corresponding two classificatory regions (Class1 and Class2) for this problem. In classification mode (i.e. non training mode) the Neural Network will determine whether a given input vector falls within Class1 or Class2 dependant upon where the input vector lies in the input space. The Neural Network presents its decision in the form of the values on its outputs: if Output1 has a value of (or close to) 0 and Output2 has a value of (or close to) 1 then the input vector will have been classified as being in Class2; if Output1 has a value of (or close to) 1 and Output2 has a value of (or close to) 0 then the input vector will have been classified as being in Class1. Such a Neural Network can be trained to determine which region/classification group the input vector should be assigned to very accurately and efficiently.

In the method presented here, the training vectors (each comprising an input-output vector pair) are provided to train a supervised training data classifier in the conventional way as described above. However these vectors are stored for future reference and, with at least one, and preferably with most or all of these vectors, there is stored an indication of a reason why the input and output vectors have been so associated, as illustrated in Table 2.

TABLE 2

XOR training vectors with associated reasons

|  | Input1 | Input2 | Output1 | Output2 | Reason |
|---|---|---|---|---|---|
| Vector1 | 0 | 0 | 1 | 0 | Both inputs off-Class1 |
| Vector2 | 0 | 1 | 0 | 1 | Only second input on-Class2 |
| Vector3 | 1 | 0 | 0 | 1 | Only first input on-Class2 |
| Vector4 | 1 | 1 | 1 | 0 | Both inputs on-Class1 |

This association of reasons to training vectors may occur prior to training of the classifier or after, and it may be made all at one time, or incrementally during operation of the classifier during or after training, dependent on when an understanding of the requisite reasons becomes known.

Once trained using the training sequence, an input vector may be presented to the trained classifier in the usual way, and a corresponding output vector is generated indicative of the classification of the input vector.

The input vector is then compared to the stored training vectors having associated reasons. Each such reason can then be presented to the user along with an indication of the degree of confidence that may be placed in associating that specific reason with classification of the present input vector.

The preferred indication of such confidence is a measure of the distance (or closeness) between (a) the input vector giving rise to the present classification output, and (b) the input vector in the training sequence associated with each given reason. This measure may be used to inform the user of the rationale behind the classification. This can be done (a) by displaying the value of the closeness measure somewhere near the reason, (b) by ordering the list of reasons presented, or (c) by restricting the set of reasons presented according to given threshold criteria (e.g. either to a predetermined maximum number of reasons, or to those reasons whose degree of confidence measure is less than some given value, or other applicable threshold criteria). Alternatively a user may first be presented with an option to request display of reasons, so that reasons are displayed only if explicitly requested.

The provision of a measure of closeness both enables the detection of new input values that are not represented in the training data set and gives the user an indication of how relevant the reason given is to the newly classified input vector.

A most preferred measure for use in determining the closest training vector to the vector being classified is the Euclidean distance. Given a vector $x_i$ where $$x_i = [x_{i1}, x_{i2}, \ldots, x_{im}] \tag{1}$$

the Euclidean distance, $\|x_i - x_j\|$, between two such vectors, $x_1$ and $x_j$, is defined by Equation (2).

$$\|x_i - x_j\| = \sqrt{\sum_{k=1}^{k=m} (x_{ik} - x_{jk})^2} \tag{2}$$

This is an acceptable distance measure for classifier inputs since the input vectors will already have been pre-processed using some form of standardisation or normalisation prior to use with the Neural Network. However, the method proposed here is not limited to the use of Euclidean distance: other distance measures could be used just as effectively accordingly to circumstances.

The use of Euclidean distance gives a numerical value representing how close the two vectors are to each other. The values returned can be used to rank the order of closeness of an input vector to the corresponding portions of training vectors and their associated reasons. However the values returned cannot as easily be used to inform the user how close the vectors are to each other. This is because the absolute range of values will be dependant upon the nature of the data set being classified, especially if the data set has not undergone a standard normalisation. A particular absolute value (e.g. 10) returned may be indicative that two vectors are very close for some datasets, and quite distant for a different data set. The nearness values presented to the user are therefore preferably converted into a standardised value (for example as a percentage of a maximum possible distance value) to be easily understandable to the end user.

To achieve this a maximum Euclidean distance between any two vectors in the training set may be determined and this distance used as a reference to determine the percentage, or other relative distance, values.

For example, again using the XOR training data set, the maximum Euclidean distance between any two input vectors is √2. Given an input vector of [0.05,0.95] 100 for which to provide a reason, the closest input training vector is [0,1] with a Euclidean distance between them 110 of 0.07. This converts into a percentage of approximately 5. The second closest are input training vectors [0,0] and [1,1] with Euclidean distances 120, 130 of 0.67 from [0.05,0.95], giving a percentage of 67; input training vector [1,0] lies at a Euclidean distance 140 of 1.34 from [0.05,0.95], giving a percentage of 95.

The results returned from the reason generation method, in response to a request for vector [0.05,0.95] would be:

Ranking 1: "Just second input on—Class2", closeness of 5%

Ranking 2: "Both inputs off—Class1", closeness of 67%

Ranking 3: "Both inputs on—Class1", closeness of 67%.

Ranking 4: "Just first input on—Class2", closeness of 95%.

The results given clearly show to the user that the input given is close to just one training vector and the reason given is highly likely to provide an accurate description of the reason for the Neural Network's classification of this input vector.

Whilst the representations both of reason and of closeness shown here are textual in nature, the invention is not limited to textual representation: other representations (e.g. graphical or aural indications) could in practice also be adopted according to the nature of the data or the context of the classification.

As can be seen even in this simple example, a clearly understandable rationale for the classifier's behaviour is presented to a user. A key feature of this method is that it remains simple for the user however large, multi-dimensional, or complex the data being classified. Another key feature is that there is no additional cost on Neural Network performance, and other computational cost only occurs when a reason is required.

In some applications there will only be a need for a reason in a relatively small proportion of the vectors being classified.

The selection of which outputs are used to extract a reason from the training data may be predetermined according to an automatic method, or may be on specific request by a user or any combination as appropriate.

In, for example, an embodiment in which a classifier is used to identify anomalies in the stream of input vectors, reasons may be identified and associated with output vectors only for some output vectors of interest. This avoids unnecessary processing overhead arising from data lookup for output vectors for which no reason is required. One example of such an embodiment is a system arranged to detect telecommunication (or other) account fraud in which input vector data relates to account usage data and classification outputs are indicative of specific types of account fraud or of normal account usage.

Figure 2:
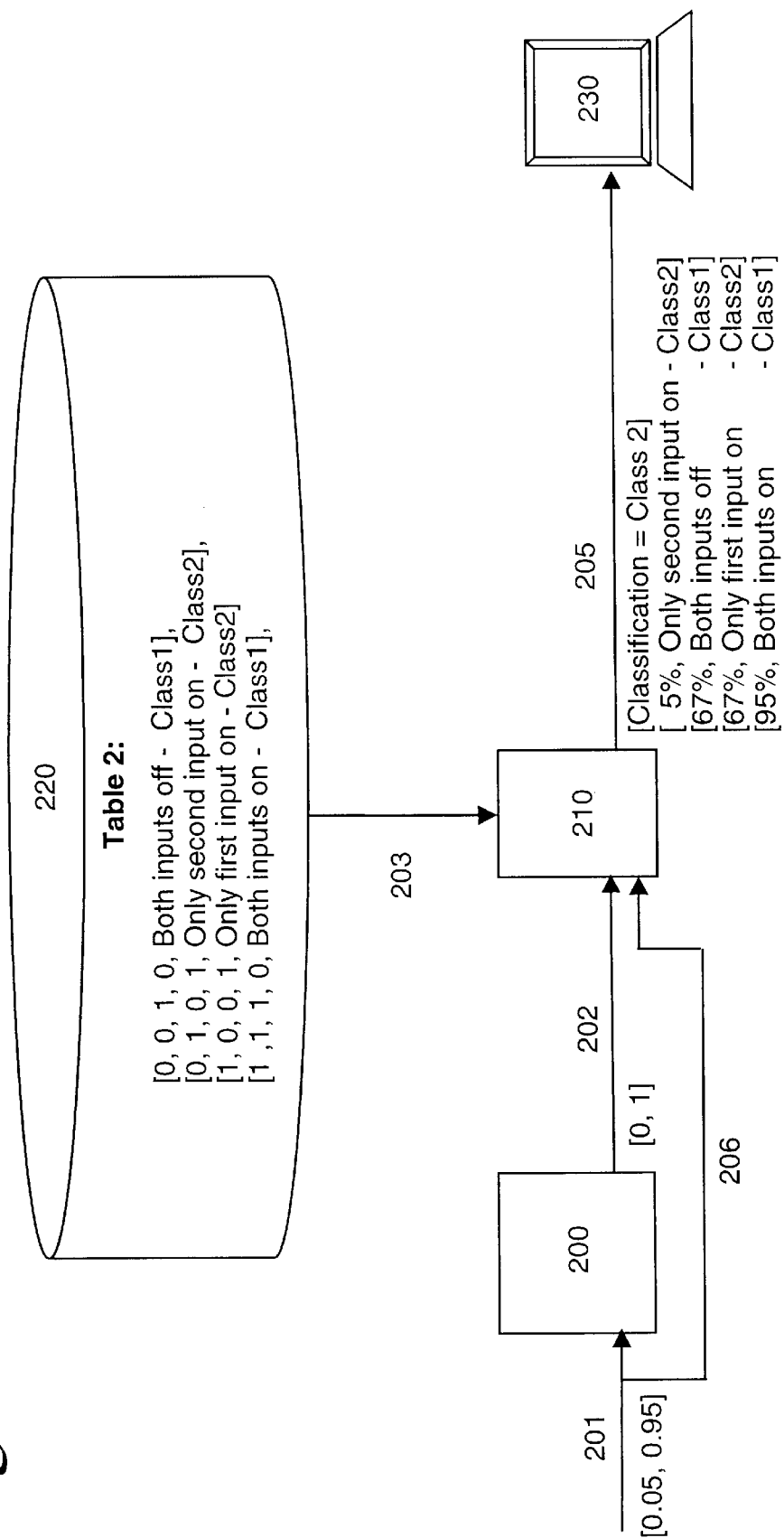
FIG. 2 shows an example of a system in accordance with the present invention.

Referring now to FIG. 2, and continuing to use the XOR example, an input vector [0.05, 0.95] is presented 201 to a trained data classifier 200 and generates 202 an output vector [0, 1] indicative of classification into Class2.

Both input 206 and the output 202 of the data classifier are provided to a processor 210 which uses the classification output to present an indication 205 of the actual classification user, whilst using the classifier input 206 with reference to a stored training vector 202 to identify possible reasons and a measure of their correlation to the given input vector.

The information can then be further processed 210 to enable its communication 205 and presentation 230 to a user.

The information is processed 210 and communicated 205 to the user showing the classification (Class2), and the identified reasons along with their respective measures of closeness:

67% - Both inputs off—Class1

5% - Only second input on—Class2

67% - Only first input on—Class2

95% - both inputs on—Class1

In order to enable a measure of closeness between current input vector and training input vector information to be calculated, the input vectors must be provided 206 to the processor 210.

The method associated with the present invention may be implemented as a program for a computer, with steps corresponding to the method steps as would be apparent to a person skilled in the art.

In summary, then, a method, apparatus, and computer software are provided whereby to associate a readily user-interpretable reason with an output of a supervised training data classifier. Reasons are associated with one or more members of a sequence of training vectors and subsequently associated, in operation, with a given classifier input by comparing the classifier input vector with training sequence vectors. A measure of confidence in the selected reasons is derived by comparing the classifier input vector with the corresponding training inputs with which the selected reasons were associated and calculating a measure of their closeness.

Any range or device value given herein may be extended or altered without losing the effect sought, as will be apparent to the skilled person for an understanding of the teachings herein.

What is claimed is:

1. A method of operating a classifier, the method comprising:

generating an output vector based on classifying an input vector; and, associating at least one reason with the output vector based on a comparison between the input vector and at least one training vector, and a previous association between the at least one training vector and the at least one reason.

2. A method according to claim 1, additionally comprising:

presenting to a user information representing at least one of:

the output vector, the at least one reason, and the association between the output vector and the at least one reason.

3. A method according to any one of claims 1–2, additionally comprising:

associating with the at least one reason with a corresponding at least one measure representing a degree of confidence in the association of the output vector with the at least one reason.

4. A method according to claim 3, additionally comprising:

presenting to a user information representing the at least one measure.

5. A method according to any one of claims 3–4, wherein the at least one measure is based on a comparison between the at least one training vector and the input vector.

6. A method according to any one of claims 3–5 wherein the at least one measure is based on a distance between the input vector and an input vector component of the at least one training vector.

7. A method according to claim 6, wherein the distance is a Euclidean distance.

8. A method according to claim 3, additionally comprising:
presenting to a user information representing the at least one measure, the information being sorted based on the at least one measure.

9. A method according to claim 3, additionally comprising:
presenting to a user the at least one reason based on a comparison between the corresponding at least one measure and a threshold criteria.

10. A method of operating a classifier, the method comprising:
associating at least one training vector with a corresponding at least one reason;
training the classifier based on the at least one training vector;
providing an input vector to the classifier;
generating an output vector based on classifying the input vector; and,
associating the at least one reason with the output vector based on
a comparison between the input vector and the at least one training vector, and
the association between the at least one training vector and the corresponding at least one reason.

11. A method according to any one of claims 1–7, 8, 9, and 10, wherein the classifier comprises a neural network.

12. A system for classifying data, the system comprising:
a classifier for generating an output vector based on an input vector;
a database including at least one association between at least one training vector and a corresponding at least one reason; and,
a processor for associating the at least one reason with the output vector based on
a comparison between the input vector and the at least one training vector, and
the association between the at least one training vector and the corresponding at least one reason.

13. A system according to claim 12, wherein the processor is designed to calculate, for the at least one reason, a corresponding at least one measure representing a degree of confidence in the association of the output vector with the at least one reason.

14. A system according to claim 13, additionally comprising:
a display for presenting to a user information representing at least one of:
the at least one reason,
the output vector, and
the association between the at least one reason and the output vector.

15. A system according to claim 14, wherein the display is designed to present to the user information representing the at least one measure.

16. An anomaly detection system comprising a system according to any one of claims 12–15.

17. An account fraud detection system comprising a system according to any one of claims 12–15.

18. A telecommunications account fraud detection system comprising a system according to any one of claims 12–15.

19. Software on a machine-readable medium arranged for operating a classifier, the software able to:
generate an output vector based on classifying an input vector; and,
associate at least one reason with the output vector based on
a comparison between the input vector and at least one training vector, and
a previous association between the at least one training vector and the at least one reason.

20. Software according to claim 19, additionally able to:
associate the at least one reason with a corresponding at least one measure representing a degree of confidence in the association of the output vector with the at least one reason.

21. Software on a machine-readable medium arranged for operating a classifier, the software able to:
associate at least one training vector with a corresponding at least one reason;
train the classifier based on the at least one training vector;
provide an input vector to the classifier;
generate an output vector based on classifying the input vector; and,
associate the at least one reason with the output vector based on
a comparison between the input vector and the at least one training vector, and
the association between the at least one training vector and the corresponding at least one reason.

* * * * *